United States Patent [19]

Strauven et al.

[11] Patent Number: 4,920,020

[45] Date of Patent: Apr. 24, 1990

[54] ZINC POWDER FOR ALKALINE BATTERIES

[75] Inventors: Ivan A. Strauven, Neerpelt; Marcel L. Meeus, Lommel, both of Belgium

[73] Assignee: Metallurgie Hoboken-Overpelt, Hoboken, Belgium

[21] Appl. No.: 293,445

[22] Filed: Jan. 4, 1989

[51] Int. Cl.$^5$ .................. H01M 4/42; C22C 18/00
[52] U.S. Cl. .................... 429/230; 75/255; 75/331; 75/351; 420/513
[58] Field of Search ............ 420/513; 75/251; 429/230

[56] References Cited

U.S. PATENT DOCUMENTS 4,632,699 12/1986 Meeus et al. .................. 420/513

FOREIGN PATENT DOCUMENTS

| 153952 | 7/1986 | Japan | 420/513 |
| 290655 | 12/1986 | Japan . | |
| 40161 | 2/1987 | Japan . | |
| 40162 | 2/1987 | Japan . | |

*Primary Examiner*—Robert McDowell
*Attorney, Agent, or Firm*—Fred Philpitt

[57] ABSTRACT

A zinc base powder for alkaline batteries consists of 0.05 to 3% of mercury, 0.003 to 0.2% of bismuth, 0.01 to 0.08% of lead, the rest being zinc. This powder has an excellent resistance to corrosion in alkaline medium.

24 Claims, No Drawings

ZINC POWDER FOR ALKALINE BATTERIES

The present invention relates to a zinc base powder containing mercury, bismuth and lead for alkaline batteries.

The presence of mercury, bismuth and lead in such a powder increases the resistance to corrosion of said powder in the electrolyte of the battery.

A zinc base powder as defined before is described in document JP-A-5,994,371. This known powder consists of 0.05% of lead, 0.01% of bismuth, 0.01% of cadmium, 0.01% of tin, 0.01% of thallium, 0.02% of indium, 0.9% of mercury, the rest being zinc. This known powder has the drawback to contain cadmium and thallium which are both very toxic elements.

The aim of the present invention is to provide a powder as defined before, which avoids the drawback of the known powder and which has an excellent resistance to corrosion in alkaline medium.

The powder according to the invention is characterized in that it consists of 0.05 to 3% in weight of mercury, 0.003 to 0.2% in weight of bismuth, 0.01 to 0.08% in weight of lead, the rest being zinc.

It was found, indeed, as will be proved further, that such a powder, although containing less corrosion inhibiting elements than the known powder, has nevertheless an excellent resistance to corrosion in alkaline medium, its resistance to corrosion being for instance as good as that of the known powder when it contains as much mercury, lead and bismuth as the known powder, what is really surprising.

The powder of the invention contains thus at least 0.05% of mercury, 0.003% of bismuth and 0.01% of lead. These contents are needed to gain sufficient corrosion resistance. The maximum contents of mercury, bismuth and lead amount respectively to 3%, 0.2% and 0.08%, higher contents giving no substantial improvement to corrosion resistance.

The expression "it consists of" used before means that the sole components of the powder are mercury, bismuth and lead, all with at least 99.9% purity, and zinc of SHG (Special High Grade) quality, as well as the impurities which are unavoidably present in these metals.

The powder contains advantageously from 0.1 to 3% of mercury, from 0.03 to 0.06% of lead and from 0.003 to 0.049% of bismuth, the most preferable mercury content ranging from 1.3 to 1.7% and that of bismuth from 0.025 to 0.045%.

The powder of the invention can be prepared according to one of the following methods:

atomization of a molten zinc bath containing all minor components (Hg, Bi, Pb);

atomization of a molten zinc bath containing already a part of the minor components (e.g.: all of the lead and part of the mercury) and introduction of the remaining minor components (e.g.: all of the bismuth and the remaining mercury) in the atomized powder either by amalgamation (e.g. with a Hg-Bi amalgam) or by cementation followed by amalgamation (e.g.: cementation of the bismuth on the atomized powder and amalgamation with mercury of the thereby obtained powder);

atomization of a molten bath of pure zinc and introduction of all minor components in the atomized powder either by amalgamation or by cementation followed by amalgamation.

EXAMPLE 1

This example relates to a zinc base powder containing mercury, bismuth and lead for alkaline batteries according to the present invention.

A molten zinc bath is prepared containing 0.05% of lead and 0.045% of bismuth. This molten bath is homogenized at 450° C. by stirring. The molten alloy is made to flow in a jet of compressed air, thereby producing an alloy powder, the particles of which have substantially the same homogeneous composition (Zn - 0.05 Pb -0.45 Bi) as that of the homogeneous molten bath.

The alloy powder is sifted so as to separate thereof the fraction over 500 $\mu$m and, as far as possible, the fraction below 75 $\mu$m. In this way an alloy powder with a particle size of 75 to 500 $\mu$m is obtained.

The sifted alloy powder is mixed at room temperature with 1.5% of mercury (with respect to zinc). In this way, one obtains a powder containing with respect to zinc 0.05% of lead, 0.045% of bismuth and 1.5% of mercury.

The resistance of this powder to corrosion in alkaline medium is examined. To this end use is made of an electrolyte composed of 35% in weight of KOH, 2% in weight of ZnO and 63% in weight of distilled water. 70 g of the powder is put in 160 ml of this electrolyte, which is kept at 71° C. and the quantity of hydrogen that is released from the electrolyte for 14 days is determined. The gassing rate is found to be 30.1 $\mu$l per gramme of powder and per day.

EXAMPLE 2

This example relates also to a powder according to the present invention.

One operates in the same way as in example 1, but, instead of preparing a molten bath containing 0.05% of lead and 0.045% of bismuth, a molten bath is prepared containing only 0.05% of lead and, instead of amalgamating the sifted alloy powder with 1.5% of mercury, it is amalgamated with 1.55% of an amalgam containing 2.9% in weight of bismuth and 97.1% in weight of mercury. In this way one obtains a powder with the same composition and the same particle size as the powder of example 1.

A gassing rate of 32.3 $\mu$l/g/day is found.

EXAMPLE 3

This example relates to a zinc base powder containing mercury, bismuth and lead for alkaline batteries according to the aforementioned prior art.

One operates in the same way as in example 1, but instead of preparing a molten bath containing 0.05% of lead and 0.045% of bismuth, a molten bath is prepared containing 0.05% of lead, 0.01% of bismuth, 0.01% of cadmium, 0.01% of tin, 0.01% of thallium and 0.02% of indium, and, instead of amalgamating the sifted alloy powder with 1.5% of mercury it is amalgamated with 0.9% of mercury. Finally, one obtains a powder containing with respect to zinc 0.05% of lead, 0.01% of bismuth, 0.01% of cadmium, 0.01% of tin, 0.01% of thallium, 0.02% of indium and 0.9% of mercury.

A gassing rate of 48.0 $\mu$l/g/day is found.

EXAMPLE 4

This example relates again to a powder according to the present invention.

One operates in the same way as in example 3, but instead of preparing a molten bath containing 0.05% of lead, 0.01% of cadmium, 0.01% of bismuth, 0.01% of tin, 0.01% of thallium and 0.02% of indium, a molten bath is prepared containing only 0.05% of lead and 0.01% of bismuth. In this way, one obtains a powder containing with respect to zinc 0.05% of lead, 0.01% of bismuth and 0.9% of mercury.

A gassing rate of 48.6 μl/g/day is found. This is quite comparable with the one found in example 3.

EXAMPLE 5

This example relates also to a powder according to the present invention.

One operates in the same way as in example 4 but instead of preparing a molten bath containing 0.05% of lead and 0.01% of bismuth, a molten bath is prepared containing 0.05% of lead and 0.045% of bismuth. In this way, one obtains a powder containing with respect to zinc 0.05% of lead, 0.045% of bismuth and 0.9% of mercury.

A gassing rate of 41.0 μl/g/day is found.

We claim:

1. A zinc base powder for alkaline batteries consisting of 0.05 to 3% of mercury, 0.003 to 0.045% of bismuth, 0.01 to 0.08% of lead, the rest being zinc.

2. A powder according to claim 1 which contains from 0.03 to 0.06% of lead.

3. A powder according to claim 1 which contains from 1.3 to 1.7% of mercury.

4. A powder according to claim 3 which contains from 0.03 to 0.06% of lead.

5. A powder according to claim 1 which contains from 0.1 to 3% of mercury.

6. A powder according to claim 5 which contains from 0.03 to 0.06% of lead.

7. A powder according to claim 1 which contains from 0.025 to 0.045% of bismuth.

8. A powder according to claim 7 which contains from 0.03 to 0.06% of lead.

9. A powder according to claim 7 which contains from 0.1 to 3% of mercury.

10. A powder according to claim 9 which contains from 0.03 to 0.06% of lead.

11. A powder according to claim 7 which contains from 1.3 to 1.7% of mercury.

12. A powder according to claim 11 which contains from 0.03 to 0.06% of lead.

13. An alkaline battery containing a zinc base powder consisting of 0.05 to 3% of mercury, 0.003 to 0.045% of bismuth, 0.01 to 0.08% of lead, the rest being zinc.

14. A battery containing a powder according to claim 13 which contains from 0.03 to 0.06% of lead.

15. A battery containing a powder according to claim 13 which contains from 1.3 to 1.7% of mercury.

16. A battery containing a powder according to claim 15 which contains from 0.03 to 0.06% of lead.

17. A battery containing a powder according to claim 13 which contains from 0.1 to 3% of mercury.

18. A battery containing a powder according to claim 17 which contains from 0.03 to 0.06% of lead.

19. A battery containing a powder according to claim 13 which contains from 0.025 to 0.045% of bismuth.

20. A battery containing a powder according to claim 19 which contains from 0.03 to 0.06% of lead.

21. A battery containing a powder according to claim 19 which contains from 0.1 to 3% of mercury.

22. A battery containing a powder according to claim 21 which contains from 0.03 to 0.06% of lead.

23. A battery containing a powder according to claim 19 which contains from 1.3 to 1.7% of mercury.

24. A battery containing a powder according to claim 23 which contains from 0.03 to 0.06% of lead.

* * * * *